June 3, 1924.
A. A. DENSMORE
AUTOMATIC GEAR SHIFTING MECHANISM
Filed March 14, 1922
1,496,211
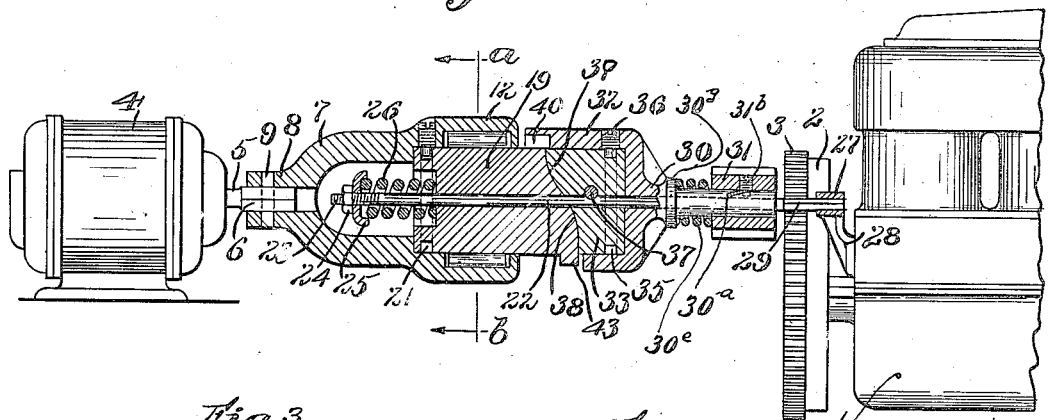
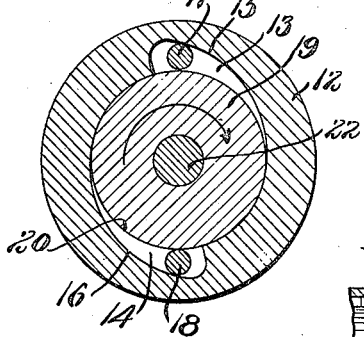
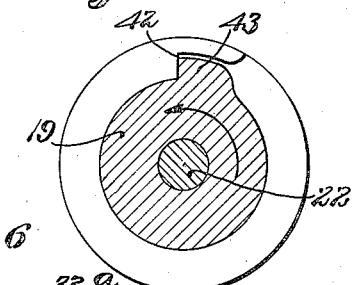
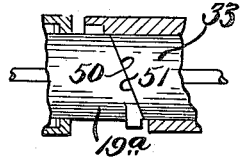
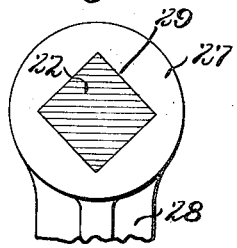
Inventor;
Albert A. Densmore,
by Roberts, Roberts & Cushman
his attys.

Patented June 3, 1924

1,496,211

UNITED STATES PATENT OFFICE.

ALBERT A. DENSMORE, OF BOSTON, MASSACHUSETTS, ASSIGNOR TO ECLIPSE MACHINE COMPANY, OF ELMIRA HEIGHTS, NEW YORK, A CORPORATION OF NEW YORK.

AUTOMATIC GEAR-SHIFTING MECHANISM.

Application filed March 14, 1922. Serial No. 543,581.

*To all whom it may concern:*

Be it known that I, ALBERT A. DENSMORE, citizen of the United States of America, and resident of Boston, in the county of Suffolk and State of Massachusetts, have invented new and useful Improvements in Automatic Gear-Shifting Mechanism, of which the following is a specification.

This invention concerns automatic gear shifting mechanism and in the embodiment herein disclosed relates more particularly to the application of such shifting mechanism to engine starting devices such as are commonly employed for starting internal combustion engines.

The usual practice at the present time is to provide the fly wheel of the engine with gear teeth on its peripheral surface, or to mount a special gear wheel upon the engine shaft, and to drive the wheel, when starting the engine, by means of a pinion of small diameter meshing with such teeth and rotated by an auxiliary electric motor. The driving of the relatively large fly wheel by the small pinion permits the use of an electric motor of small size and comparatively low power for starting the engine, the arrangement described being permissible by reason of the fact that it is only necessary to turn the engine shaft slowly for producing the initial compression and firing of the fuel charge in starting. If however, when the engine starts to run under its own power and the fly wheel picks up speed, the motor pinion be allowed to remain in mesh with the fly wheel gear teeth, such pinion, with the motor shaft and rotor will be driven at a speed far in excess of that for which such parts are designed, causing heating of the bearings and rapid deterioration of the motor parts. To avoid this difficulty it has been proposed to so arrange the driving pinion upon the motor shaft as to permit it to be moved into and out of mesh with the fly wheel gear at the proper times, and in order to relieve the operator of the engine of the necessity of shifting such pinion into and out of meshing relation to the fly wheel gear, certain forms of automatic gear shifting mechanism have heretofore been devised. In most such mechanism, relatively movable parts having intermeshing screw threads are employed for determining the interconnection of the fly wheel with the motor shaft, and while such devices in most cases are effective for automatically connecting the fly wheel and motor upon energization of the latter, they are not nearly so reliable in disconnecting the parts, so that they fail in the very particular for which the mechanism is primarily intended. Moreover, as the operator is accustomed to place entire dependence upon this mechanism and as it, together with the motor are commonly concealed from view, any failure of such mechanism to disconnect the motor at the proper time may remain unnoticed until the motor has suffered substantial injury or complete destruction.

The object of the present invention is accordingly to provide automatic gear shifting mechanism applicable for use in the starting of internal combustion engines, such mechanism being certain in its action, both in connecting and disconnecting the motor and fly wheel, and at the same time being of simple and durable construction and reliable in operation under all conditions of use.

While the inventive idea herein disclosed may obviously be expressed in various concrete forms, a single physical embodiment of means well adapted for use in attaining the desired result is herein illustrated, by way of example, in the accompanying drawings in which:—

Fig. 1 is a longitudinal, vertical cross section through the mechanism of the invention herein disclosed, showing certain associated parts in elevation, and illustrating the position of the operative parts of the mechanism when the engine is running;

Fig. 2 is a front elevation, partly in cross section, of the devices shown in Fig. 1, but illustrating the parts in the position which they occupy during the starting of the engine;

Fig. 3 is a transverse cross section to large scale on the line *a—b* of Fig. 1;

Fig. 4 is a similar cross section on the line *c—d* of Fig. 2;

Fig. 5 is a cross section to large scale on a line such as *e—f* of Fig. 2; and

Fig. 6 is a fragmentary vertical cross section illustrating a modified form of device.

Referring to the drawings, an internal combustion engine of any known type is indicated generally at 1, such engine having a fly wheel 2 provided with a spur gear 3. This gear may comprise teeth formed integrally with the rim of the fly wheel or may consist of a separate gear secured thereto, or if desired such gear might be attached to the engine shaft independently of the fly wheel. At 4 is indicated an electric motor of the type commonly employed in connection with internal combustion engines for starting the latter, such motor receiving its energy from a suitable source, such for example as a storage battery, not here-in disclosed. The motor 4 is provided with a shaft 5, which for convenience, and as herein illustrated, may be of square or other polygonal cross section at its end portion, as indicated at 6. Mounted upon the polygonal portion of the shaft, for rotation therewith, is a yoke 7 having at its closed end a sleeve portion 8 provided with an opening of suitable form for the reception of the end of the shaft. The parts may be secured together by means of a pin 9 passing through the sleeve and shaft. While as herein shown the shaft is squared at its end, it is to be understood that the invention is not concerned particularly with this arrangement, but that any suitable means may be employed for securing the yoke to the shaft to rotate therewith.

The yoke preferably comprises a pair of oppositely disposed arms 10, 11 which serve to support a sleeve member 12. This latter member constitutes one element of a roller clutch, being provided with diametrically disposed recesses, 13, 14 in its inner peripheral surface, these recesses having cam faces 15, 16 respectively for engagement with rollers 17, 18 arranged within the recesses. Within the sleeve 12, and concentric therewith, is a cylindrical block 19 constituting the other element of the clutch. The surface 20 of such block engages the rollers 17, 18, and upon rotation of the sleeve 12 in the proper direction the block 19 is rotated therewith, the parts being so constructed and arranged, however, that movement of the block 19 at a speed greater than that of the sleeve 12 serves to disconnect such parts. Although a roller clutch is especially desirable for the purpose, by reason of its noiselessness and certainty in action, it is evident that other types of unidirectional, or ratchet clutch may be as good or better, under some conditions of use, than the clutch here disclosed. The block 19 is preferably provided with a circumferential groove 21 with which engages the inner end of a pin 21ª secured in the sleeve 12, the block 19 being thus prevented from moving axially with respect to the yoke, while at the same time relative rotation of such parts is permitted.

The block 19 is provided with an axial bore through which passes a shaft 22, the shaft being free for axial movement as well as rotation within the block. The shaft projects beyond the block and into the space between the yoke arms 10, 11, and at its end is threaded at 23 for the reception of a nut 24. This nut serves to secure a collar 25 upon the shaft, and interposed between said collar and the end of the block 19 is a coiled compression spring 26 surrounding the shaft. With the parts thus arranged the spring 26 normally tends to move the shaft 22 toward the left with respect to block 19 as viewed in Fig. 1. The opposite end of the shaft 22 is received in an opening in a bearing 27 carried by a bracket 28 which may be secured to the engine frame or any other convenient part. The end of the shaft is squared as seen at 29 and the opening in the bearing 27 is similarly formed, this being a preferred arrangement whereby longitudinal sliding of the shaft is freely permitted while rotation thereof is prevented.

A sleeve 30 is mounted upon the shaft 22, such sleeve being free to rotate and also to slide axially of the shaft. Mounted upon one end of this sleeve is a pinion 31 which may be caused to mesh with the gear 3 upon proper movement of the sleeve in a longitudinal direction. While this pinion may be fixed directly to the sleeve, it is preferred to arrange it for limited movement, both in an axial and circumferential direction relatively to the sleeve. This may be accomplished by providing the sleeve with a short, helical cam slot 30ª, with which engages the end of a pin 31ᵇ fast in the pinion. A heavy coil spring 30ᶜ is interposed between the left-hand face of the pinion, as viewed in Fig. 1, and a collar or flange 30ᵍ fast to the sleeve. If desired the ends of the teeth of the pinion 31 or of the gear 3, or of both may be suitably bevelled, undercut or otherwise shaped to facilitate the proper intermeshing of the pinion teeth with those of the gear as the pinion is moved toward the latter. The other end of the sleeve 30 is of relatively large diameter, as indicated at 32, and within the chamber formed between the walls of such enlarged portion and the shaft 22, a cylindrical block 33 is arranged, this block having an axial opening for the passage of the shaft 22. The block 33 is preferably secured to the sleeve member 32, so as to partake of the axial movement of the latter, by means of a pin 36 engaging a circumferential groove 35 in the block 33. The block 33 is fixedly secured to the shaft 22 by means of a pin 37. The end of the block 19 is provided with a cam surface 38 which is complemental to a cam surface 39 formed upon the adjacent end of the block 33.

In the edge of the enlarged portion 32 of the sleeve 30, a recess 40 is provided, such recess having an end wall 41 lying in a plane substantially perpendicular to the axis of the shaft, and being also provided with a radial wall 42 lying in a plane passing longitudinally through the axis of the shaft. This recess is disposed at a point in the sleeve member 32 which is adjacent to the high part of the cam face 39. At a point adjacent to the high portion of the cam face 38 of the block 19, the latter is provided with a radial lug or projection 43, the purpose of which will hereinafter be described. While as herein disclosed, both blocks 19 and 33 are provided with inclined cam faces, this may not always be necessary, as a cam element upon one of such blocks only might under certain circumstances, be sufficient for the purpose. Moreover, while a certain type of cam is herein illustrated, it is to be understood that any mechanical element having equivalent functions might be substituted for the device herein shown if circumstances should so demand. In a modified form of the device shown in Fig. 6, the cam block 19ª is provided with an oblique and substantially plain cam face 50, while the cam block 33ª is provided with a complemental and substantially plain surface 51.

It being assumed that the parts occupy the position of Fig. 1 the operation of the device in starting the engine is as follows: Upon closing of a suitable switch to energize the motor 4, the shaft 5 is rotated, thereby rotating the yoke 7 and the sleeve 12. The rotation of the latter serves to pick up the rollers 17, 18 thereby clutching the block 19 to the yoke and causing such block to rotate with the motor shaft 5. Immediately upon rotation of the block 19, the cam face 38 thereof, reacting against the cam face 39 of the block 33 pushes the latter block axially toward the engine. As the shaft 22 is pinned to the block 33, such shaft also moves with the block thereby placing spring 26 under compression. At the same time the sleeve 30 is caused to move longitudinally with the block and the shaft until the pinion 31 is carried into mesh with the gear 3. If upon initiation of movement of the pinion 31 toward the gear 3, the teeth of the latter should be opposed to those of the gear, the pressure upon the end face of the pinion would cause it to move axially along the sleeve, compressing spring 30ᵉ. Such movement however, immediately results in rotating the pinion by reason of engagement of pin 31ᵇ with the cam slot 30ª. This movement of the pinion serves to bring the teeth of the latter opposite the spaces between the teeth of the gear 3, whereupon the spring 30ᵉ acts to snap the pinion quickly into mesh. The length and angularity of cam slot 30ª need only be sufficient to produce a rotary movement of the pinion of substantially one tooth width. This action takes place during the first half rotation or less of the motor shaft. As the high parts of the cams approach each other, the lug 43 enters the recess 40 bearing against the end wall 41 thereof and also against the side wall 42. The engagement of the lug with the end wall 41 serves in a positive manner temporarily to prevent the spring 26 from restoring the shaft 22 and the sleeve to normal position, while the engagement of the lug with the shoulder 42 serves to transmit movement of rotation from the rotating block 19 to the sleeve 30, thereby positively rotating the pinion 31 and the gear 3. The pinion 31 continues to rotate in this manner until the engine shaft has been turned over sufficiently to provide the necessary compression and ignition of the charge. When the engine picks up speed under its own power, the gear 3 serves to drive the pinion 31 at a rate faster than is imparted thereto by the motor 4. As soon as this takes place, the recessed portion of the sleeve member 32 is advanced beyond the lug 43 and at the same time the cam members 38 and 39 are moved relatively in such fashion as to permit the spring 26 to retract the shaft 22. This serves to draw the pinion out of engagement with the gear 3 and the greater the difference between the speed of the engine shaft and that of the motor shaft the more certain is this disengagement to take place. It is thus clear that there is no possibility, so long as the parts remain intact, that the motor shaft will be driven for any length of time from the engine shaft.

If during the operation of withdrawal of the pinion 31 from the gear 3, undue cohesion of the engaging parts as by the accumulation of grease or dirt thereon, should be such as to delay such withdrawal for any extended period, the provision of the roller clutch, comprising the members 12, 19 and the rollers 17, 18, serves to avoid any substantial speeding up of the motor shaft 5, as immediately upon an increase of speed of the member 19 with respect to the member 12, such parts become unclutched so that no power is transmitted from the part 19 to the part 12.

Thus by the use of two independent devices, the motor is insured against overspeeding by connection with the engine shaft after the latter is running in normal fashion. In the device shown in Fig. 6 cams of somewhat different form from those illustrated in Fig. 1 are shown, these cams being simpler and easier to construct. The operation of the parts is the same, however, as that above described with respect to the device of Fig. 1.

While a desirable arrangement has herein been specifically described, it is to be understood that various changes in detail structure as well as in specific arrangement of parts and subcombinations thereof may well be made without in any manner affecting the function of the device, and it is contemplated that such changes may from time to time be made as circumstances may require, all within the scope of the invention as expressed in the appended claims.

What I claim and desire to secure by Letters Patent of the United States is:

1. Automatic gear shifting apparatus comprising a longitudinally slidable non-rotary support, a rotary drive pinion mounted thereon, spring means constantly urging said support in one direction, means for moving said support in opposition to said spring and carrying the pinion into engagement with a member of the engine to be started, and means for rotating said pinion.

2. Automatic gear shifting mechanism comprising a longitudinally slidable, non-rotary guide shaft, a rotary pinion thereon, means normally urging said shaft in one direction, means for moving said shaft in the opposite direction and carrying the pinion into engagement with a member of the engine to be started, and means for rotating said pinion.

3. In combination with a driven gear, a driving pinion, a non-rotary guide shaft for supporting said pinion to slide into and out of mesh with said gear, means normally tending to move said pinion out of mesh with the gear, and cam means for moving said pinion into mesh with the gear.

4. In combination with a driven gear, a pinion, a non-rotary guide shaft for movement into and out of mesh with the driven gear, spring means normally operative to move said pinion out of mesh with the gear, means for moving said pinion in opposition to the spring, and means automatically operative after the completion of such latter movement for rotating the pinion.

5. A mechanism of the class described comprising a slidable shaft, means for preventing rotation of the shaft, resilient means urging said shaft in one direction, a rotary cam element for moving the shaft in opposition to the spring, a pinion freely rotatable upon the shaft and carried by said cam action upon the shaft into engagement with a member of the engine to be started, and means for rotating the pinion.

6. A gear shifting mechanism of the class described comprising an axially movable shaft, means to prevent rotation thereof, a member fixed to the shaft, a member mounted for rotation about the axis of the shaft, one of said members having a cam element engageable with the other, a pinion axially movable with the shaft but free for rotation thereon, and means for rotating the movable member and the pinion.

7. A gear mechanism for transmitting motion from a motor shaft to an engine shaft gear comprising an axially movable shaft arranged in substantial alignment with the motor shaft, means for preventing rotation of said movable shaft, a pinion mounted for rotation upon said movable shaft, but axially movable therewith, said pinion being engageable with the engine shaft gear, means normally urging said movable shaft in a direction to retain said pinion out of mesh with said gear, and means actuable by the motor shaft for imparting movement to said movable shaft whereby first to carry the pinion into mesh with the gear and then to rotate said pinion.

8. An automatic gear shifting mechanism comprising a pinion, an axially movable, rotary member for supporting the pinion, a non-rotary shaft on which said pinion and rotary member are mounted, said member having a substantially radial abutment, a rotary cam for moving said supporting member in an axial direction, and a lug moving with said cam and engageable with said abutment for rotating said supporting member and pinion.

9. A gear shifting mechanism comprising an axially movable shaft, means to prevent rotation thereof, an abutment member fixed to the shaft, a member mounted for rotation upon said shaft and having an inclined cam face engageable with the abutment whereby to impart longitudinal movement to the shaft, a pinion mounted for rotation upon the shaft and movable axially therewith, and means for turning the rotary member and the pinion.

10. A device of the class described comprising an axially movable, rotary sleeve having a pinion mounted thereon, said sleeve having a recess in its inner wall, means for moving said sleeve in an axial direction, and means rotating about the axis of the sleeve and engageable with said recess for positively rotating said sleeve.

11. A device of the class described comprising an axially movable and rotary sleeve provided at one end with a portion of relatively large diameter, a pinion connected to the other end of the sleeve, a block coaxial with the sleeve and disposed within the larger end thereof, rotary cam means engageable with said block for moving the sleeve axially, and a lug moving with the cam means and engageable with an element of the sleeve for positively rotating the latter.

12. A mechanism of the class described comprising an axially movable, rotary sleeve having a part of large diameter at one end, said part having a recess in its edge, a block seated within said large portion of the sleeve and rotary with respect thereto, a second rotary cam block coaxial with the sleeve, said latter block having a cam face cooperable with an element of the first block to impart axial movement to the latter and to the sleeve, a driving member adapted to engage a member of the engine to be started and responsive to the movements of said second block, and a lug projecting radially from the second block and engageable with the recess to impart movement of rotation to the sleeve.

13. A device of the class described comprising an axially movable, non-rotary shaft, a pinion mounted for rotation thereon and for axial movement with the shaft, an abutment member secured to the shaft, said member having a cam face, a second member arranged adjacent to the abutment member upon the shaft, said second member being free to rotate and having a cam face engageable with the cam face of the abutment member, and means for rotating said second member and for rotating the pinion.

14. A gear mechanism for transmitting movement from a motor to a fly wheel gear comprising a non-rotary shaft aligned with the motor shaft, and movable in an axial direction, a pinion mounted for free rotation upon the axially movable shaft, means constraining the pinion to move axially with the shaft, a block fast to the shaft, said block having a cam face at one end, a member mounted for rotation upon said axially movable shaft and having an element engageable with said cam face, means movable upon rotation of the motor shaft for rotating said rotary member, and means for imparting movement of rotation to the pinion.

15. An engine starter device comprising an axially movable, non-rotary shaft, a pinion mounted on the shaft for axial movement therewith, a block mounted upon the shaft for free rotation thereon, a collar fast to the shaft, a coil spring encircling the shaft and interposed between the collar and the block, a second block fast to the shaft and for axial movement with the shaft, a cam element upon one of said blocks and engageable with the other, and means for rotating said first named block.

16. An engine starter device comprising in combination with a motor shaft a yoke having means for securing it to a motor shaft, a block carried by the yoke and having a central opening, an axially movable, non-rotary shaft passing freely through said opening, a pinion mounted on the shaft for axial movement therewith, spring means normally urging said shaft in one direction, and interengaging cam elements, one of which is carried by said block, for imparting longitudinal movement to the non-rotary shaft upon rotation of the motor shaft.

17. An engine starter device comprising in combination with a motor shaft an axially movable, non-rotary shaft, a pinion mounted on the shaft for axial movement therewith, a cylindrical block fixed to the shaft and provided with a cam face at one end, a second block mounted for free rotation relatively to the shaft and having a cam face at one end complementary to and engageable with the aforesaid cam face, and means for connecting said second block to a motor shaft for rotation thereby.

18. An engine starter comprising in combination with a motor shaft a yoke, means for securing said yoke to the motor shaft, a block carried by the yoke, said block having an axial opening and an oblique end face, a non-rotary and axially movable shaft passing freely through said opening, a pinion mounted on the shaft for axial movement therewith, a collar upon the shaft and within the yoke, a spring interposed between the collar and the block, and a second block fixed to the shaft and having an oblique end face engaging the end face of the first block.

19. A mechanism of the class described comprising in combination with a motor shaft a yoke member provided with means whereby it may be secured to a motor shaft, a sleeve fast to said yoke member and constituting the driving element of a roller clutch, a cylindrical block arranged within said sleeve and constituting the driven element of said clutch, clutch rolls interposed between said elements, a second and axially movable block coaxial with said first block and having a cam face engageable therewith, a pinion movable axially with said second block, and means for transmitting movement of rotation from said first block to said pinion.

20. A device of the class described comprising a non-rotary, longitudinally movable, elongate support, a pinion mounted for rotation upon said support, a block having an inclined end face fixed to said support, a second and rotary block mounted upon said support adjacent to said first named block, said rotary block having an inclined end face engageable with the aforesaid face of the first block, spring means normally urging said support in one direction, means for turning said rotary block whereby through the mutual reaction of said inclined faces to force the support in the other direction, and means for turning the pinion.

21. A starting device for use with internal combustion engines comprising a pinion engageable with a gear on the engine shaft, an axially movable, rotary sleeve supporting the pinion, a cam member mounted for rotation relatively to the sleeve, but movable axially therewith, abutment means carried by the sleeve, an axially movable, non-rotary shaft passing freely through the sleeve, means fixing said cam member thereto, a second and complemental cam member freely rotatable upon the shaft, a collar fast to the shaft, a coil compression spring surrounding the shaft and interposed between the collar and said second cam member, an element movable with said second cam member and engageable with the aforesaid abutment, means for rotating said second cam member, and means for preventing axial movement thereof.

Signed by me at Boston, Massachusetts, this 8th day of March, 1922.

ALBERT A. DENSMORE.